United States Patent
Fechtmann et al.

(10) Patent No.: US 11,542,030 B1
(45) Date of Patent: Jan. 3, 2023

(54) SELF-HEATING AND SELF-SEALING BLADDER

(71) Applicant: United States of America, as represented by the Secretary of the Navy, Patuxent River, MD (US)

(72) Inventors: Michael Fechtmann, Lusby, MD (US); Nathan Tenney, Hollywood, MD (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 17/496,171

(22) Filed: Oct. 7, 2021

(51) Int. Cl.
*B64D 37/06* (2006.01)
*B60K 15/03* (2006.01)

(52) U.S. Cl.
CPC ........ *B64D 37/06* (2013.01); *B60K 15/03177* (2013.01); *B60K 2015/03407* (2013.01); *B60K 2015/03447* (2013.01)

(58) Field of Classification Search
CPC .............. B60K 15/03; B60K 15/03006; B60K 15/03046; B60K 15/03032; B60K 15/03052; B60K 15/03059; B60K 15/03065; B60K 15/03177; B60K 2015/03407; B60K 2015/03447; B64D 37/06
See application file for complete search history.

(56) References Cited

U.S. PATENT DOCUMENTS

| | | | | |
|---|---|---|---|---|
| 3,509,016 A | * | 4/1970 | Wickersham, Jr. | .... B65D 90/22 220/900 |
| 3,664,904 A | * | 5/1972 | Cook | .................... B32B 27/308 220/560.04 |
| 5,383,567 A | * | 1/1995 | Sorathia | ........... B60K 15/03177 220/900 |
| 9,770,883 B1 | * | 9/2017 | Luzetsky | ................ B60K 15/00 |
| 10,471,676 B1 | * | 11/2019 | Whipple | .................. B32B 25/10 |
| 11,168,962 B2 | * | 11/2021 | Bongiovanni | ......... B65D 90/06 |
| 2013/0068878 A1 | * | 3/2013 | Liardon | ................ B64C 27/006 244/17.23 |
| 2022/0024325 A1 | * | 1/2022 | Pettey | .............. B60K 15/03177 |

* cited by examiner

*Primary Examiner* — Richard G Davis
(74) *Attorney, Agent, or Firm* — Mark O. Glut; Nawcad

(57) ABSTRACT

A self-heating and self-sealing bladder comprising of a fuel and water resistant layer overlaid on a mold; an adhesive tack layer overlaid on the fuel and water resistant layer; a first fabric reinforcement layer overlaid on the adhesive tack layer; a microballoon powder, water containing microspheres, and reactive salt powders disposed in a plurality of pouches such that upon activation the microballoon powder and the reactive salt powders come in contact with the water and react to create a formulation that results in heat and expansion, thus a self-sealing capability; and, a second fabric reinforcement layer overlaid the plurality of pouches.

1 Claim, 4 Drawing Sheets

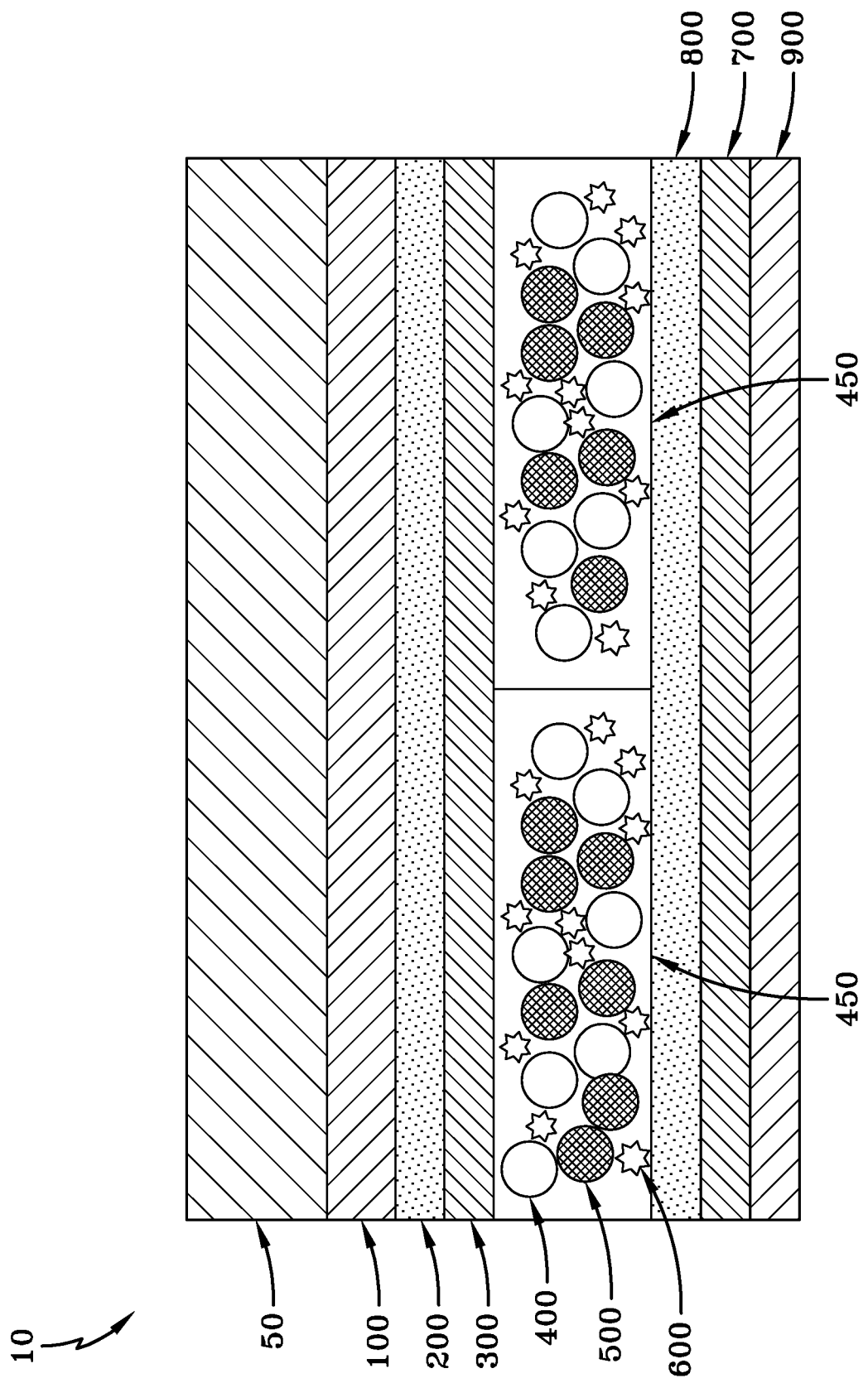

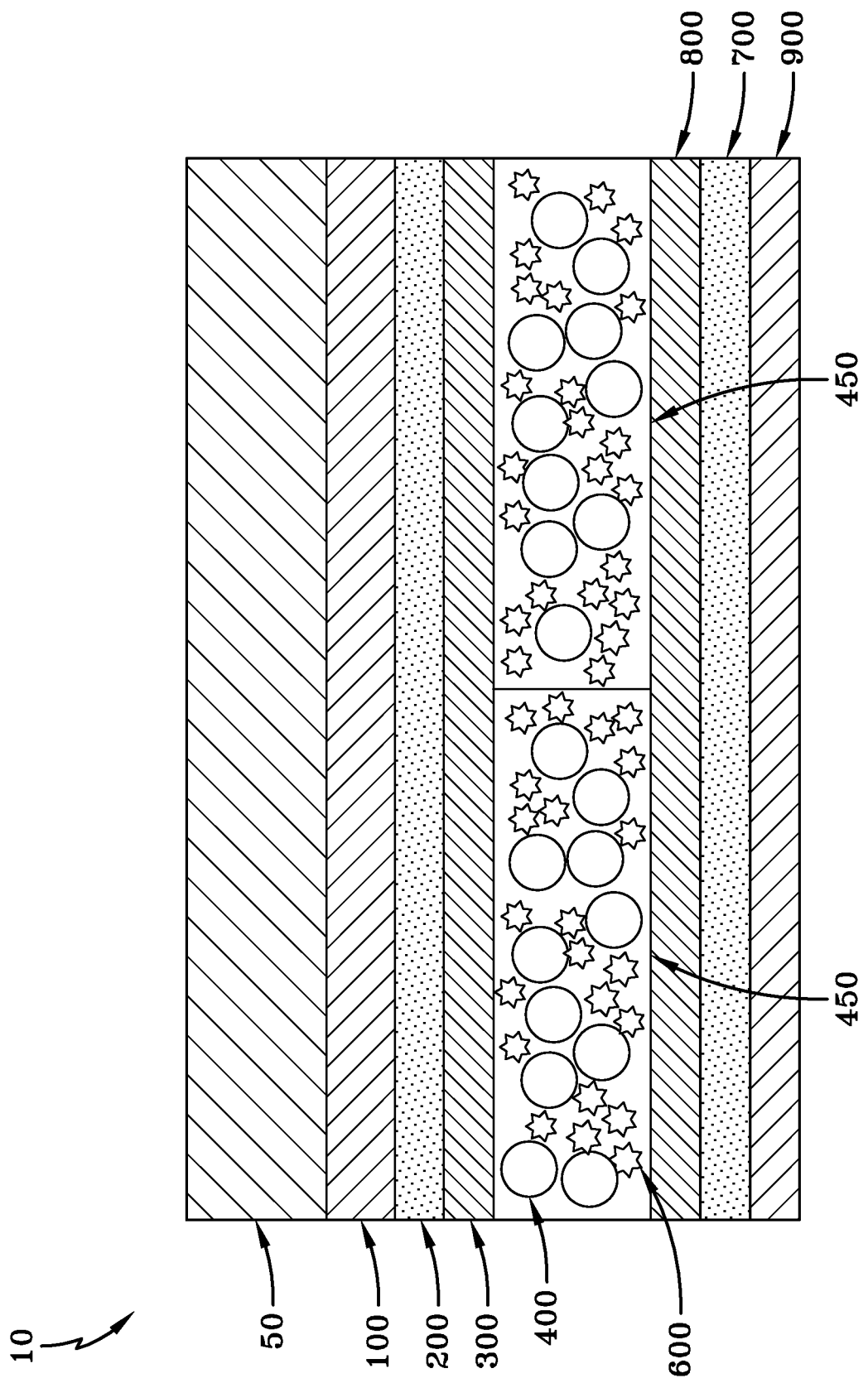

SELF-HEATING AND SELF-SEALING BLADDER

STATEMENT OF GOVERNMENT INTEREST

The invention described herein may be manufactured and used by or for the Government of the United States of America for governmental purposes without payment of any royalties thereon or therefor.

BACKGROUND

There currently exist materials that expand significantly due to an increase in temperature, but there are no materials that are capable of expanding significantly, without other external stimulus, into a semi-rigid foam after a puncture or crushing impact. This type of material can be useful for self-sealing fuel bladders, particularly in military air vehicles. Self-sealing of wounds in fuel bladders is currently accomplished through the use of a layer of uncured natural gum rubber that is normally not in contact with fuel. However, upon puncturing of the fuel bladder, the natural gum rubber is exposed to fuel. The fuel causes the natural gum rubber to swell and expand to seal the wound. There are variations on this swelling theme, with the use of synthetic polymers and polymer foams that will swell in fuel, like styrene-butadiene-styrene (SBS) polymers. Unfortunately, these materials tend to not be effective unless a significant amount of material is used, which is detrimental to the weight of an air vehicle. Additionally, the material expands very slowly, which allows significant fuel leakage before sealing. Similarly, there are polymers that expand when swelled in water and can be used in a similar manner to gum rubber, but for sealing water filled bladders.

Thus, there is a need for a material formulation that expands significantly, and one method to create significant expansion of a material is to foam the material upon heating (like an intumescent material). Intumescent materials rely on external heat sources, so a material formulation that also generates its own heat after a puncture or mechanical shock is necessary for self-sealing. Materials that expand into a foam due to an increase in temperature (i.e. intumescent materials) are known for use in fire protection and fire suppression, but have not been used to self-seal fuel bladders or tanks, nor do they incorporate a self-heating reaction, so the expansion is reliant upon external heat. U.S. Pat. No. 5,383,567, entitled "Protective Device for Container," by Usman A. Sorathia (not admitted to be prior art), suggests using heat expandable materials as a self-sealing mechanism to contain hot molten materials, however, this material formulation is not self-heating.

There are self-healing material formulations that incorporate particles into a matrix, however, they are for rigid material systems, so the self-healing mechanism is designed to improve mechanical strength after damage. These materials are not designed to expand, and therefore only heal small amounts of damage, typically cracks or small cuts.

SUMMARY

The present invention is directed to with the needs enumerated above and below.

The present invention is directed to a self-heating and self-sealing bladder that contains a fluid and does not suffer from degradation. The bladder may be an aviation fuel bladder which is crashworthy and self-sealing as defined by MIL-DTL-27422F or solely self-sealing as defined by MIL-DTL-5578D (both MIL-DTL-27422F and MIL-DTL-5578D are herein incorporated by reference, but are not admitted to be prior art). In either case, the fuel bladder, but without limitation, includes an elastomer inner liner, a fuel barrier made from a low fuel permeability polymer (such as nylon or polyvinylidene fluoride), reinforcement plies made from elastomer coated fabrics, the self-sealing and self-heating material of the invention, and an exterior abrasion resistant coating.

It is a feature of the present invention to provide a self-heating and self-sealing bladder that has material that significantly expands when exposed to heat, and is capable of heating itself after a puncture or crushing impact.

It is a feature of the present invention to provide a self-heating and self-sealing bladder that has material that self-seals a puncture wound without the need to react chemically or physically with fuel or oil.

It is a feature of the present invention to provide a self-heating and self-sealing bladder that has material that significantly expands when exposed to heat, and is capable of heating itself after a puncture or crushing impact and the material is contained within a heat-shrinking polymer to pull the material into a wound and apply pressure.

It is a feature of the present invention to provide a self-heating and self-sealing material that can be used on its own, without limitation, in boat hulls, pipes, fuel hoses, fuel tanks, corrosion inhibiting coatings, and inflatable products.

It is a feature of the present invention to provide a self-heating and self-sealing bladder that is self-heating and foam-able, but has initially a non-buoyant material formulation that can be contained in a packet or grid of packets or pouches, but can be activated through crushing, puncture, or selective/controlled opening of the packet or pouch to self-heat and cause the packet or pouch to become buoyant.

It is a feature of the present invention to provide a self-heating and self-sealing bladder that is self-heating and foam-able, but has initially an un-foamed material formulation that can be contained in a thin packet or grid of packets, but can be activated to self-heat through crushing, puncture, or selective/controlled exposure of the contents of the packet to water and cause the packet to expand in volume to move objects.

DRAWINGS

These and other features, aspects and advantages of the present invention will become better understood with reference to the following description and appended claims, and accompanying drawings wherein:

FIG. 3 is a cross-sectional view of an embodiment of the invention with additional fabric and adhesive layers; and, FIG. 4 is a cross sectional view of an embodiment of the invention that relies on external water to activate the salts and microballoons in the pouches.

DESCRIPTION

Figure 1:
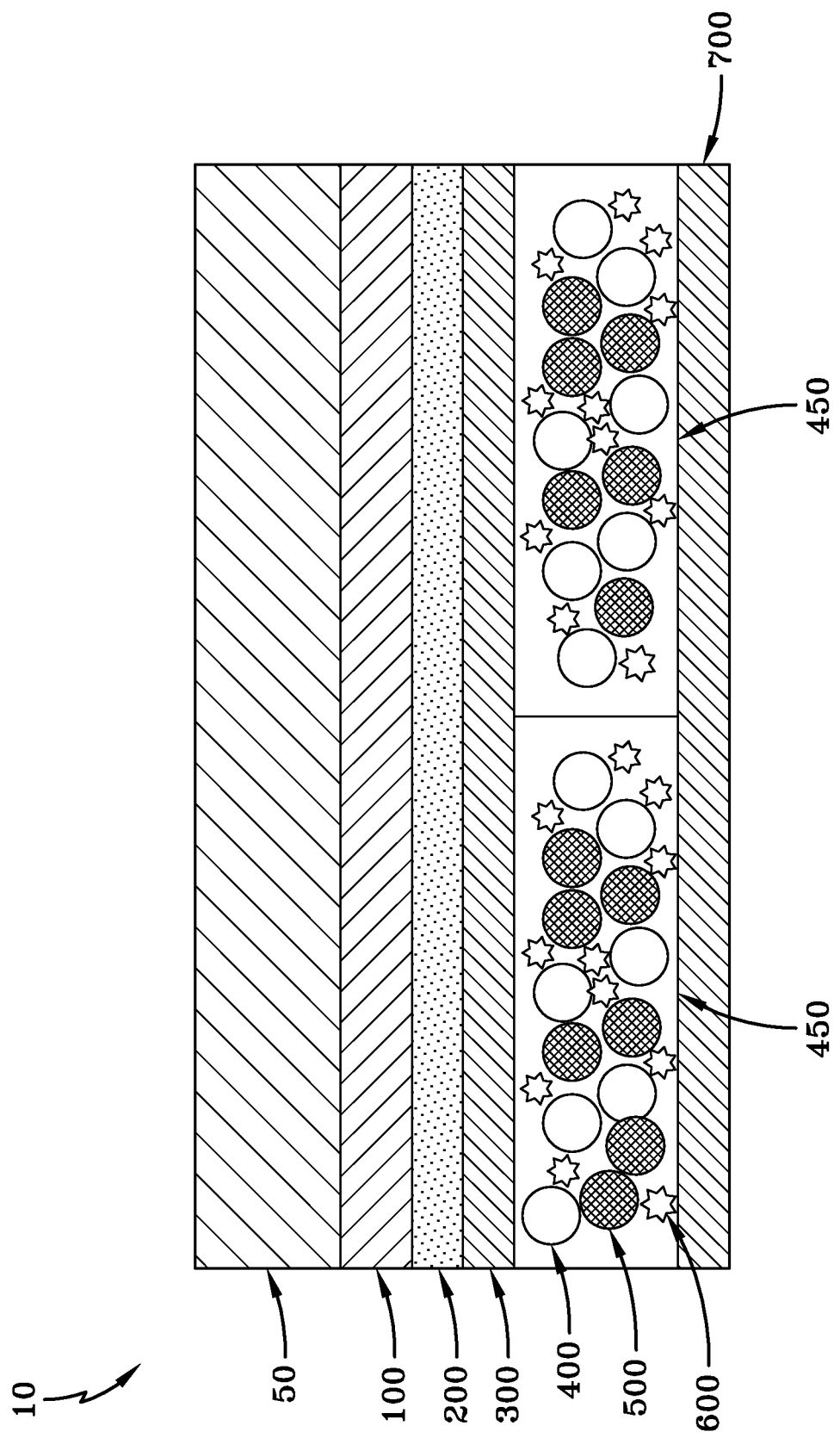
FIG. 1 is a cross-sectional view of the layers of a fuel bladder that incorporate the novel self-heating and self-sealing material formulation.

The preferred embodiments of the present invention are illustrated by way of example below and in FIGS. 1-2. As shown in FIG. 1, the self-heating and self-sealing bladder 10 includes a fuel and water resistant layer 100 overlaid on a mold 50; an adhesive tack layer 200 overlaid on the fuel and water resistant layer 100; a first fabric reinforcement layer 300 overlaid on the adhesive tack layer 200; a microballoon powder 400 in a plurality of pouches 450; water containing microspheres 500 in the same plurality of pouches 450; reactive salt powders 600 in the same plurality of pouches 450; the plurality of filled pouches 450 displaced over the first fabric reinforcement 300 such that upon activation (crushing or other fracture of the water containing microspheres) the microballoon powder 400 and the reactive salt powders 600 come in contact with water and react to create a formulation that results in heat and expansion, thus a self-sealing capability; and, a second fabric reinforcement layer 700 overlaid the plurality of pouches 450.

In the description of the present invention, the invention will be discussed in a military environment; however, this invention can be utilized for any type of application that requires use of a self-heating and self-sealing bladder.

The fuel and water resistant layer 100 may be, but without limitation, a water resistant polymer layer sprayed or laid over a mold 50. The mold 50 may, but without limitation, be inflatable and removable, inflatable and non-removable (so that the mold become the inner layer of the fuel bladder), dissolvable (such a polystyrene foam that can be dissolved in organic solvents), or removable by means of breaking the mold apart (plaster, foam, 3D jigsaw puzzle pieces).

The adhesive tack layer 200 may be polyurea or any adhesive practicable. The adhesive tack layer 200 provides a bond between the fuel and water resistant layer 100 and the first fabric reinforcement layer 300.

In the preferred embodiment the microballoon powder 400 may be a thermoplastic polymer shell that is filled with a volatile liquid. The polymer needs to soften and the volatile liquid needs to expand at the desired temperature of the particular application. For, fuel bladders the targeted temperature is 80° C. Possible shell thermoplastics are, but without limitation, polyolefins, polyethylene, polyether ether ketone, polyvinyldiene fluoride, and polystyrene. Possible volatile liquids are, but without limitation, propane, butane, pentane, ethanol, propanol, butanol, or similar alkanes and alcohols. However, for both, any material or liquid that is practicable can be utilized.

The reactive salt powders 600 may be, but without limitation, calcium oxide and/or magnesium oxide, however, any reactive salt powder that generates heat upon dilution in water or contact with water can be used. In the preferred embodiment of a formulation that does not require external water for a reaction, the proportions of the ingredients of the formulation are as follows: approximately 1 g calcium oxide; approximately 1 g magnesium chloride; approximately 2 g water filled microcapsules; and approximately 0.25 g microballoons. In the preferred embodiment of a formulation that requires external water for a reaction, the proportions of the ingredients of the formulation are as follows: approximately 1 g calcium oxide; approximately 1 g magnesium chloride; and approximately 0.25 g microballoons. However, in all embodiments of the invention, any formulation that results in the desired effect can be utilized. Polymerization reactions that generate heat may also be used. For example, but without limitation, the polymerization of polyurethane from a di-isocyanate and a polyol generates sufficient heat to expand the microballoons. The di-isocyanate and polyol can be contained in separate microspheres and when the microspheres are ruptured to release their contents, the polymerization reaction occurs and generates heat.

The pouches 450 may be, but without limitation, shrinking or non-heat shrinking polyolefin or nylon, or any other material practicable. In an alternative embodiment, the ingredients of the formulation can be embedded in a polymer matrix instead of in pouches 450. The polymer matrix should be a very low solid and/or very porous so that the flow of water to the salt is not impeded. If the flow is impeded, the water and salt will not react and not generate heat after the water containing microcapsules are ruptured.

Figure 2:
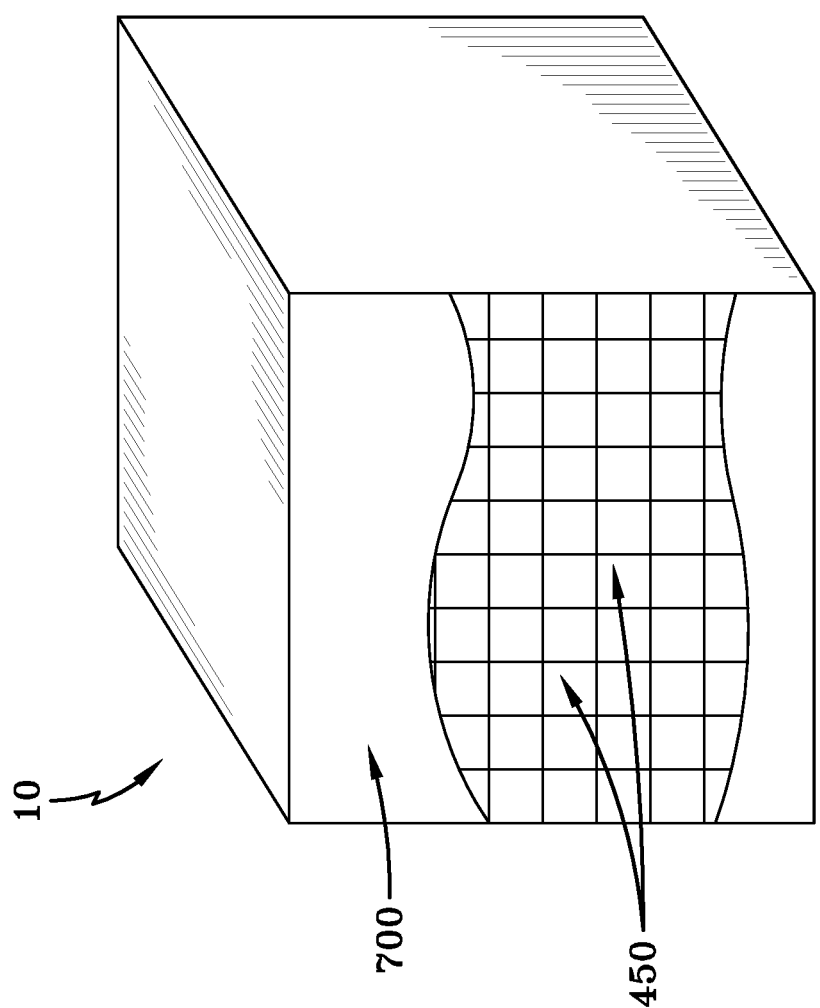
FIG. 2 is a view of a grid of packets in the wall of a bladder.

As shown in FIG. 2, the plurality of pouches 450 may be arranged in a grid to grant the desired surfaces of the bladder a self-sealing capability. In one of the embodiments of the invention, the pouches 450 are optimally made from a heat shrinking polyolefin film that will shrink as the reactive salt powder 600 heats up, which will add some compression to the wound as the microballoon powder 400 expands into microballoons and help seal the wound.

As shown in FIG. 3, the self-heating and self-sealing bladder 10 may alternatively also include a second adhesive layer 800 to attach the second fabric layer 700 to the outside of the self-sealing pouches layer, and a second adhesive tack layer 900 for abrasion and UV resistance.

As discussed earlier, the invention may include a water containing bladder embodiment or a non-water containing bladder embodiment. The water containing version is for use when water is available within the bladder, while the non-water version is for use when no water is available within the bladder, such as, but without limitation, a fuel bladder. As shown in FIG. 4, the water containing version does not utilize or include the water containing microspheres 500 in a plurality of pouches 450.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A self-heating and self-sealing bladder comprising of:
   a fuel and water resistant layer overlaid on a mold;
   an adhesive tack layer overlaid on the fuel and water resistant layer;
   a first fabric reinforcement layer overlaid on the adhesive tack layer;
   a microballoon powder, water containing microspheres, and reactive salt powders disposed in a plurality of pouches such that upon activation the microballoon powder and the reactive salt powders come in contact with the water and react to create a formulation that results in heat and expansion, thus a self-sealing capability; and,
   a second fabric reinforcement layer overlaid the plurality of pouches.

* * * * *